United States Patent
Coon

(10) Patent No.: US 9,483,853 B2
(45) Date of Patent: Nov. 1, 2016

(54) SYSTEMS AND METHODS TO DISPLAY RENDERED IMAGES

(71) Applicant: GLASSES.COM INC., Mason, OH (US)

(72) Inventor: Jonathan Coon, Austin, TX (US)

(73) Assignee: Glasses.com Inc., Mason, OH (US)

( * ) Notice: Subject to any disclaimer, the term of this patent is extended or adjusted under 35 U.S.C. 154(b) by 122 days.

(21) Appl. No.: 13/662,118

(22) Filed: Oct. 26, 2012

(65) Prior Publication Data

US 2013/0342575 A1 Dec. 26, 2013

Related U.S. Application Data

(60) Provisional application No. 61/650,983, filed on May 23, 2012.

(51) Int. Cl.
G06T 11/60 (2006.01)
G06T 11/00 (2006.01)

(52) U.S. Cl.
CPC .............. *G06T 11/60* (2013.01); *G06T 11/00* (2013.01); *G06T 2210/16* (2013.01)

(58) Field of Classification Search
None
See application file for complete search history.

(56) References Cited

U.S. PATENT DOCUMENTS

| | | |
|---|---|---|
| 3,927,933 A | 12/1975 | Humphrey |
| 4,370,058 A | 1/1983 | Trötscher et al. |
| 4,467,349 A | 8/1984 | Maloomian |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |

(Continued)

FOREIGN PATENT DOCUMENTS

| | | |
|---|---|---|
| DE | 10007705 A1 | 9/2001 |
| EP | 0092364 A1 | 10/1983 |

(Continued)

OTHER PUBLICATIONS

PCT International Search Report for PCT International Patent Application No. PCT/US2013/042504, mailed Aug. 19, 2013.

(Continued)

*Primary Examiner* — Kee M Tung
*Assistant Examiner* — Yi Wang
(74) *Attorney, Agent, or Firm* — Holland & Hart LLP

(57) ABSTRACT

A computer-implemented method to display a rendered image is described. A base image is obtained. A rendered image is obtained. The rendered image is matched to a location on the base image. The rendered image is overlaid onto the base image at the location to generate a set of layered images. The set of layered images is displayed.

21 Claims, 12 Drawing Sheets

(56) References Cited

U.S. PATENT DOCUMENTS

| | | |
|---|---|---|
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A | 11/2000 | Bornstein |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi et al. |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 | 5/2006 | Cheatle et al. |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |

(56) References Cited

U.S. PATENT DOCUMENTS

| | | |
|---|---|---|
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 * | 2/2010 | Saldanha et al. ............ 345/630 |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |
| 8,351,649 B1 | 1/2013 | Medioni et al. |
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |
| 8,411,092 B2 | 4/2013 | Sheblak et al. |
| 8,433,157 B2 | 4/2013 | Nijim et al. |
| 8,447,099 B2 | 5/2013 | Wang et al. |
| 8,459,792 B2 | 6/2013 | Wilson |
| 8,605,942 B2 | 12/2013 | Takeuchi |
| 8,605,989 B2 | 12/2013 | Rudin et al. |
| 8,743,051 B1 | 6/2014 | Moy et al. |
| 8,813,378 B2 | 8/2014 | Grove |
| 2001/0023413 A1 | 9/2001 | Fukuma et al. |
| 2001/0026272 A1 | 10/2001 | Feld et al. |
| 2001/0051517 A1 | 12/2001 | Strietzel |
| 2002/0010655 A1 | 1/2002 | Kjallstrom |
| 2002/0105530 A1 | 8/2002 | Waupotitsch et al. |
| 2002/0149585 A1 | 10/2002 | Kacyra et al. |
| 2003/0001835 A1 | 1/2003 | Dimsdale et al. |
| 2003/0030904 A1 | 2/2003 | Huang |
| 2003/0071810 A1 | 4/2003 | Shoov et al. |
| 2003/0110099 A1 | 6/2003 | Trajkovic et al. |
| 2003/0112240 A1 | 6/2003 | Cerny |
| 2004/0004633 A1 | 1/2004 | Perry et al. |
| 2004/0090438 A1 | 5/2004 | Alliez et al. |
| 2004/0217956 A1 | 11/2004 | Besl et al. |
| 2004/0223631 A1 | 11/2004 | Waupotitsch et al. |

(56) References Cited

U.S. PATENT DOCUMENTS

| | | |
|---|---|---|
| 2004/0257364 A1 | 12/2004 | Basler |
| 2005/0053275 A1 | 3/2005 | Stokes |
| 2005/0063582 A1 | 3/2005 | Park et al. |
| 2005/0111705 A1 | 5/2005 | Waupotitsch et al. |
| 2005/0128211 A1 | 6/2005 | Berger et al. |
| 2005/0162419 A1* | 7/2005 | Kim .................. G06T 15/00 345/419 |
| 2005/0190264 A1 | 9/2005 | Neal |
| 2005/0208457 A1 | 9/2005 | Fink et al. |
| 2005/0226509 A1 | 10/2005 | Maurer et al. |
| 2006/0012748 A1 | 1/2006 | Periasamy et al. |
| 2006/0017887 A1 | 1/2006 | Jacobson et al. |
| 2006/0067573 A1 | 3/2006 | Parr et al. |
| 2006/0127852 A1 | 6/2006 | Wen |
| 2006/0161474 A1 | 7/2006 | Diamond et al. |
| 2006/0212150 A1 | 9/2006 | Sims |
| 2006/0216680 A1 | 9/2006 | Buckwalter et al. |
| 2007/0013873 A9 | 1/2007 | Jacobson et al. |
| 2007/0104360 A1 | 5/2007 | Huang et al. |
| 2007/0127848 A1 | 6/2007 | Kim et al. |
| 2007/0160306 A1 | 7/2007 | Ahn et al. |
| 2007/0183679 A1* | 8/2007 | Moroto et al. .................. 382/254 |
| 2007/0233311 A1 | 10/2007 | Okada et al. |
| 2007/0262988 A1 | 11/2007 | Christensen |
| 2008/0084414 A1 | 4/2008 | Rosel et al. |
| 2008/0112610 A1 | 5/2008 | Israelsen et al. |
| 2008/0136814 A1 | 6/2008 | Chu et al. |
| 2008/0152200 A1 | 6/2008 | Medioni et al. |
| 2008/0162695 A1 | 7/2008 | Muhn et al. |
| 2008/0163344 A1 | 7/2008 | Yang |
| 2008/0170077 A1 | 7/2008 | Sullivan et al. |
| 2008/0201641 A1 | 8/2008 | Xie |
| 2008/0219589 A1 | 9/2008 | Jung et al. |
| 2008/0240588 A1 | 10/2008 | Tsoupko-Sitnikov et al. |
| 2008/0246759 A1 | 10/2008 | Summers |
| 2008/0271078 A1 | 10/2008 | Gossweiler et al. |
| 2008/0278437 A1 | 11/2008 | Barrus et al. |
| 2008/0278633 A1 | 11/2008 | Tsoupko-Sitnikov et al. |
| 2008/0279478 A1 | 11/2008 | Tsoupko-Sitnikov et al. |
| 2008/0280247 A1 | 11/2008 | Sachdeva et al. |
| 2008/0294393 A1 | 11/2008 | Laake et al. |
| 2008/0297503 A1 | 12/2008 | Dickinson et al. |
| 2008/0310757 A1 | 12/2008 | Wolberg et al. |
| 2009/0010507 A1 | 1/2009 | Geng |
| 2009/0040216 A1 | 2/2009 | Ishiyama |
| 2009/0123037 A1 | 5/2009 | Ishida |
| 2009/0129402 A1 | 5/2009 | Moller et al. |
| 2009/0132371 A1 | 5/2009 | Strietzel et al. |
| 2009/0135176 A1 | 5/2009 | Snoddy et al. |
| 2009/0135177 A1 | 5/2009 | Strietzel et al. |
| 2009/0144173 A1 | 6/2009 | Mo et al. |
| 2009/0153552 A1 | 6/2009 | Fidaleo et al. |
| 2009/0153553 A1 | 6/2009 | Kim et al. |
| 2009/0153569 A1 | 6/2009 | Park et al. |
| 2009/0154794 A1 | 6/2009 | Kim et al. |
| 2009/0184960 A1 | 7/2009 | Carr et al. |
| 2009/0185763 A1 | 7/2009 | Park et al. |
| 2009/0219281 A1 | 9/2009 | Maillot |
| 2009/0279784 A1 | 11/2009 | Arcas et al. |
| 2009/0304270 A1 | 12/2009 | Bhagavathy et al. |
| 2009/0310861 A1 | 12/2009 | Lang et al. |
| 2009/0316945 A1 | 12/2009 | Akansu |
| 2009/0316966 A1 | 12/2009 | Marshall et al. |
| 2009/0324030 A1* | 12/2009 | Frinking et al. .................. 382/128 |
| 2009/0324121 A1 | 12/2009 | Bhagavathy et al. |
| 2010/0030578 A1 | 2/2010 | Siddique et al. |
| 2010/0134487 A1 | 6/2010 | Lai et al. |
| 2010/0138025 A1 | 6/2010 | Morton et al. |
| 2010/0141893 A1 | 6/2010 | Altheimer et al. |
| 2010/0145489 A1 | 6/2010 | Esser et al. |
| 2010/0166978 A1 | 7/2010 | Nieminen |
| 2010/0179789 A1 | 7/2010 | Sachdeva et al. |
| 2010/0191504 A1 | 7/2010 | Esser et al. |
| 2010/0198817 A1 | 8/2010 | Esser et al. |
| 2010/0209005 A1 | 8/2010 | Rudin et al. |
| 2010/0277476 A1 | 11/2010 | Johanson et al. |
| 2010/0293192 A1 | 11/2010 | Suy et al. |
| 2010/0293251 A1 | 11/2010 | Suy et al. |
| 2010/0302275 A1 | 12/2010 | Saldanha et al. |
| 2010/0329568 A1 | 12/2010 | Gamliel et al. |
| 2011/0001791 A1 | 1/2011 | Kirshenboim et al. |
| 2011/0025827 A1 | 2/2011 | Shpunt et al. |
| 2011/0026606 A1 | 2/2011 | Bhagavathy et al. |
| 2011/0026607 A1 | 2/2011 | Bhagavathy et al. |
| 2011/0029561 A1 | 2/2011 | Slaney et al. |
| 2011/0040539 A1 | 2/2011 | Szymczyk et al. |
| 2011/0043540 A1 | 2/2011 | Fancher et al. |
| 2011/0043610 A1 | 2/2011 | Ren et al. |
| 2011/0071804 A1 | 3/2011 | Xie |
| 2011/0075916 A1 | 3/2011 | Knothe et al. |
| 2011/0096832 A1 | 4/2011 | Zhang et al. |
| 2011/0102553 A1 | 5/2011 | Corcoran et al. |
| 2011/0115786 A1 | 5/2011 | Mochizuki |
| 2011/0148858 A1 | 6/2011 | Ni et al. |
| 2011/0157229 A1 | 6/2011 | Ni et al. |
| 2011/0158394 A1 | 6/2011 | Strietzel |
| 2011/0166834 A1 | 7/2011 | Clara |
| 2011/0188780 A1 | 8/2011 | Wang et al. |
| 2011/0208493 A1 | 8/2011 | Altheimer et al. |
| 2011/0211816 A1 | 9/2011 | Goedeken et al. |
| 2011/0227923 A1 | 9/2011 | Mariani et al. |
| 2011/0227934 A1 | 9/2011 | Sharp |
| 2011/0229659 A1 | 9/2011 | Reynolds |
| 2011/0229660 A1 | 9/2011 | Reynolds |
| 2011/0234581 A1 | 9/2011 | Eikelis et al. |
| 2011/0234591 A1 | 9/2011 | Mishra et al. |
| 2011/0249136 A1 | 10/2011 | Levy |
| 2011/0262717 A1 | 10/2011 | Broen et al. |
| 2011/0267578 A1 | 11/2011 | Wilson |
| 2011/0279634 A1* | 11/2011 | Periyannan et al. ......... 348/14.09 |
| 2011/0292034 A1 | 12/2011 | Corazza et al. |
| 2011/0293247 A1 | 12/2011 | Bhagavathy et al. |
| 2011/0304912 A1 | 12/2011 | Broen et al. |
| 2012/0002161 A1 | 1/2012 | Altheimer et al. |
| 2012/0008090 A1 | 1/2012 | Atheimer et al. |
| 2012/0013608 A1 | 1/2012 | Ahn et al. |
| 2012/0016645 A1 | 1/2012 | Altheimer et al. |
| 2012/0021835 A1 | 1/2012 | Keller et al. |
| 2012/0038665 A1 | 2/2012 | Strietzel |
| 2012/0075296 A1 | 3/2012 | Wegbreit et al. |
| 2012/0079377 A1 | 3/2012 | Goosens |
| 2012/0082432 A1 | 4/2012 | Ackley et al. |
| 2012/0114184 A1 | 5/2012 | Barcons-Palau et al. |
| 2012/0114251 A1 | 5/2012 | Solem et al. |
| 2012/0121174 A1 | 5/2012 | Bhagavathy et al. |
| 2012/0130524 A1 | 5/2012 | Clara et al. |
| 2012/0133640 A1 | 5/2012 | Chin et al. |
| 2012/0133850 A1 | 5/2012 | Broen et al. |
| 2012/0147324 A1 | 6/2012 | Marin et al. |
| 2012/0158369 A1 | 6/2012 | Bachrach et al. |
| 2012/0162218 A1 | 6/2012 | Kim et al. |
| 2012/0166431 A1 | 6/2012 | Brewington et al. |
| 2012/0170821 A1 | 7/2012 | Zug et al. |
| 2012/0176380 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |
| 2012/0294369 A1 | 11/2012 | Bhagavathy et al. |
| 2012/0294530 A1 | 11/2012 | Bhaskaranand |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0314023 A1 | 12/2012 | Barcons-Palau et al. |
| 2012/0320153 A1 | 12/2012 | Barcons-Palau et al. |
| 2012/0323581 A1 | 12/2012 | Strietzel et al. |
| 2013/0027657 A1 | 1/2013 | Esser et al. |

(56) References Cited

U.S. PATENT DOCUMENTS

| | | | |
|---|---|---|---|
| 2013/0070973 | A1 | 3/2013 | Saito et al. |
| 2013/0088490 | A1 | 4/2013 | Rasmussen et al. |
| 2013/0187915 | A1 | 7/2013 | Lee et al. |
| 2013/0201187 | A1 | 8/2013 | Tong et al. |
| 2013/0271451 | A1 | 10/2013 | Tong et al. |

FOREIGN PATENT DOCUMENTS

| | | | |
|---|---|---|---|
| EP | 0359596 | A1 | 3/1990 |
| EP | 0994336 | A2 | 4/2000 |
| EP | 1011006 | A1 | 6/2000 |
| EP | 1136869 | A1 | 9/2001 |
| EP | 1138253 | A2 | 10/2001 |
| EP | 0444902 | B2 | 6/2002 |
| EP | 1450201 | A1 | 8/2004 |
| EP | 1728467 | A1 | 12/2006 |
| EP | 1154302 | B1 | 8/2009 |
| FR | 2966038 | A1 | 4/2012 |
| GB | 2449855 | A | 12/2008 |
| JP | 2003345857 | A | 12/2003 |
| JP | 2004272530 | A | 9/2004 |
| JP | 2005269022 | A | 9/2005 |
| KR | 20000028583 | A | 5/2000 |
| KR | 200000051217 | A | 8/2000 |
| KR | 20040097200 | A | 11/2004 |
| KR | 20080086945 | A | 9/2008 |
| KR | 20100050052 | A | 5/2010 |
| WO | WO 9300641 | A1 | 1/1993 |
| WO | WO 9604596 | A1 | 2/1996 |
| WO | WO 9740342 | A2 | 10/1997 |
| WO | WO 9740960 | A1 | 11/1997 |
| WO | WO 9813721 | A1 | 4/1998 |
| WO | WO 9827861 | A1 | 7/1998 |
| WO | WO 9827902 | A2 | 7/1998 |
| WO | WO 9835263 | A1 | 8/1998 |
| WO | WO 9852189 | A2 | 11/1998 |
| WO | WO 9857270 | A1 | 12/1998 |
| WO | WO 9956942 | A1 | 11/1999 |
| WO | WO 9964918 | A1 | 12/1999 |
| WO | WO 0000863 | A1 | 1/2000 |
| WO | WO 0016683 | A1 | 3/2000 |
| WO | WO 0045348 | A1 | 8/2000 |
| WO | WO 0049919 | A1 | 8/2000 |
| WO | WO 0062148 | A1 | 10/2000 |
| WO | WO 0064168 | A1 | 10/2000 |
| WO | WO 0123908 | A1 | 4/2001 |
| WO | WO 0132074 | A1 | 5/2001 |
| WO | WO 0135338 | A1 | 5/2001 |
| WO | WO 0161447 | A1 | 8/2001 |
| WO | WO 0167325 | A1 | 9/2001 |
| WO | WO 0174553 | A2 | 10/2001 |
| WO | WO 0178630 | A1 | 10/2001 |
| WO | WO 0188654 | A2 | 11/2001 |
| WO | WO 0207845 | A1 | 1/2002 |
| WO | WO 0241127 | A2 | 5/2002 |
| WO | WO 03079097 | A1 | 9/2003 |
| WO | WO 03084448 | A1 | 10/2003 |
| WO | WO 2007012261 | A1 | 2/2007 |
| WO | WO 2007017751 | A1 | 2/2007 |
| WO | WO 2007018017 | A1 | 2/2007 |
| WO | WO 2008009355 | A1 | 1/2008 |
| WO | WO 2008009423 | A1 | 1/2008 |
| WO | WO 2008135178 | A1 | 11/2008 |
| WO | WO 2009023012 | A1 | 2/2009 |
| WO | WO 2009043941 | A1 | 4/2009 |
| WO | 2010039976 | A1 | 4/2010 |
| WO | 2010042990 | A1 | 4/2010 |
| WO | WO 2011012743 | A2 | 2/2011 |
| WO | WO 2011095917 | A1 | 8/2011 |
| WO | WO 2011134611 | A1 | 11/2011 |
| WO | WO 2011147649 | A1 | 12/2011 |
| WO | WO 2012051654 | A1 | 4/2012 |
| WO | WO 2012054972 | A1 | 5/2012 |
| WO | WO 2012054983 | A1 | 5/2012 |

OTHER PUBLICATIONS

PCT International Search Report for PCT International Patent Application No. PCT/US2013/042509, mailed Sep. 2, 2013.
PCT International Search Report for PCT International Patent Application No. PCT/US2013/042514, mailed Aug. 30, 2013.
PCT International Search Report for PCT International Patent Application No. PCT/US2013/042517, mailed Aug. 29, 2013.
PCT International Search Report for PCT International Patent Application No. PCT/US2013/042512, mailed Sep. 6, 2013.
PCT International Search Report for PCT International Patent Application No. PCT/US2013/042529, mailed Sep. 17, 2013.
PCT International Search Report for PCT International Patent Application No. PCT/US2013/042525, mailed Sep. 17, 2013.
PCT International Search Report for PCT International Patent Application No. PCT/US2013/042520, mailed Sep. 27, 2013.
Tracker, Tracker Help, Nov. 2009.
3D Morphable Model Face Animation, http://www.youtube.com/watch?v=nice6NYb_WA, Apr. 20, 2006.
Visionix 3D iView, Human Body Measurement Newsletter, vol. 1., No. 2, Sep. 2005, pp. 2 and 3.
Blaise Aguera y Arcas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
PCT International Search Report for PCT International Patent Application No. PCT/US2012/068174, mailed Mar. 7, 2013.
Information about Related Patents and Patent Applications, see the section below having the same title.
U.S. Appl. No. 13/837,039, filed Mar. 15, 2013, Systems and Methods for Generating a 3-D Model of a Virtual Try-On Product.
U.S. Appl. No. 13/775,785, filed Feb. 25, 2013, Systems and Methods for Adjusting a Virtual Try-On.
U.S. Appl. No. 13/775,764, filed Feb. 25, 2013, Systems and Methods for Feature Tracking.
U.S. Appl. No. 13/774,995, filed Feb. 22, 2013, Systems and Methods for Scaling a Three-Dimensional Model.
U.S. Appl. No. 13/774,985, filed Feb. 22, 2013, Systems and Methods for Generating a 3-D Model of a Virtual Try-On Product.
U.S. Appl. No. 13/774,983, filed Feb. 22, 2013, Systems and Methods for Generating a 3-D Model of a User for a Virtual Try-On Product.
U.S. Appl. No. 13/774,978, filed Feb. 22, 2013, Systems and Methods for Efficiently Processing Virtual 3-D Data.
U.S. Appl. No. 13/774,958, filed Feb. 22, 2013, Systems and Methods for Rendering Virtual Try-On Products.
U.S. Appl. No. 13/706,909, filed Dec. 6, 2012, Systems and Methods for Obtaining a Pupillary Distance Measurement Using a Mobile Computing Device.
U.S. Appl. No. 13/662,118, filed Oct. 23, 2012, Systems and Methods to Display Rendered Images.
Sinha et al., GPU-based Video Feautre Tracking and Matching, http:::frahm.web.unc.edu/files/2014/01/GPU-based-Video-Feature-Tracking-And Matching.pdf, May 2006.
Dror et al., Recognition of Surface Relfectance Properties form a Single Image under Unknown Real-World Illumination, IEEE, Proceedings of the IEEE Workshop on Identifying Objects Across Variations in Lighting: Psychophysics & Computation, Dec. 2011.
Simonite, 3-D Models Created by a Cell Phone, Mar. 23, 2011, url: http://www.technologyreview.com/news/423386/3-d-models-created-by-a-cell-phone/.
Fidaleo, Model-Assisted 3D Face Reconstruction from Video, AMFG'07 Analysis and Modeling of Faces and Gestures Lecture Notes in Computer Science vol. 4778, 2007, pp. 124-138.
Garcia-Mateos, Estimating 3D facial pose in video with just three points, CVPRW '08 Computer vision and Patter Recognition Workshops, 2008.

\* cited by examiner

US 9,483,853 B2

SYSTEMS AND METHODS TO DISPLAY RENDERED IMAGES

RELATED APPLICATIONS

This application claims priority to U.S. Provisional Application No. 61/650,983, entitled SYSTEMS AND METHODS TO VIRTUALLY TRY-ON PRODUCTS, and filed on May 23, 2012, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. For example, computers have opened up an entire industry of internet shopping. In many ways, online shopping has changed the way consumers purchase products. However, in some cases, consumers may avoid shopping online. For example, it may be difficult for a consumer to know if they will look good in and/or with a product without seeing themselves in and/or with the product. In many cases, this challenge may deter a consumer from purchasing a product online. Therefore, improving the online shopping experience may be desirable. In various situations, it may be desirable to render an image.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
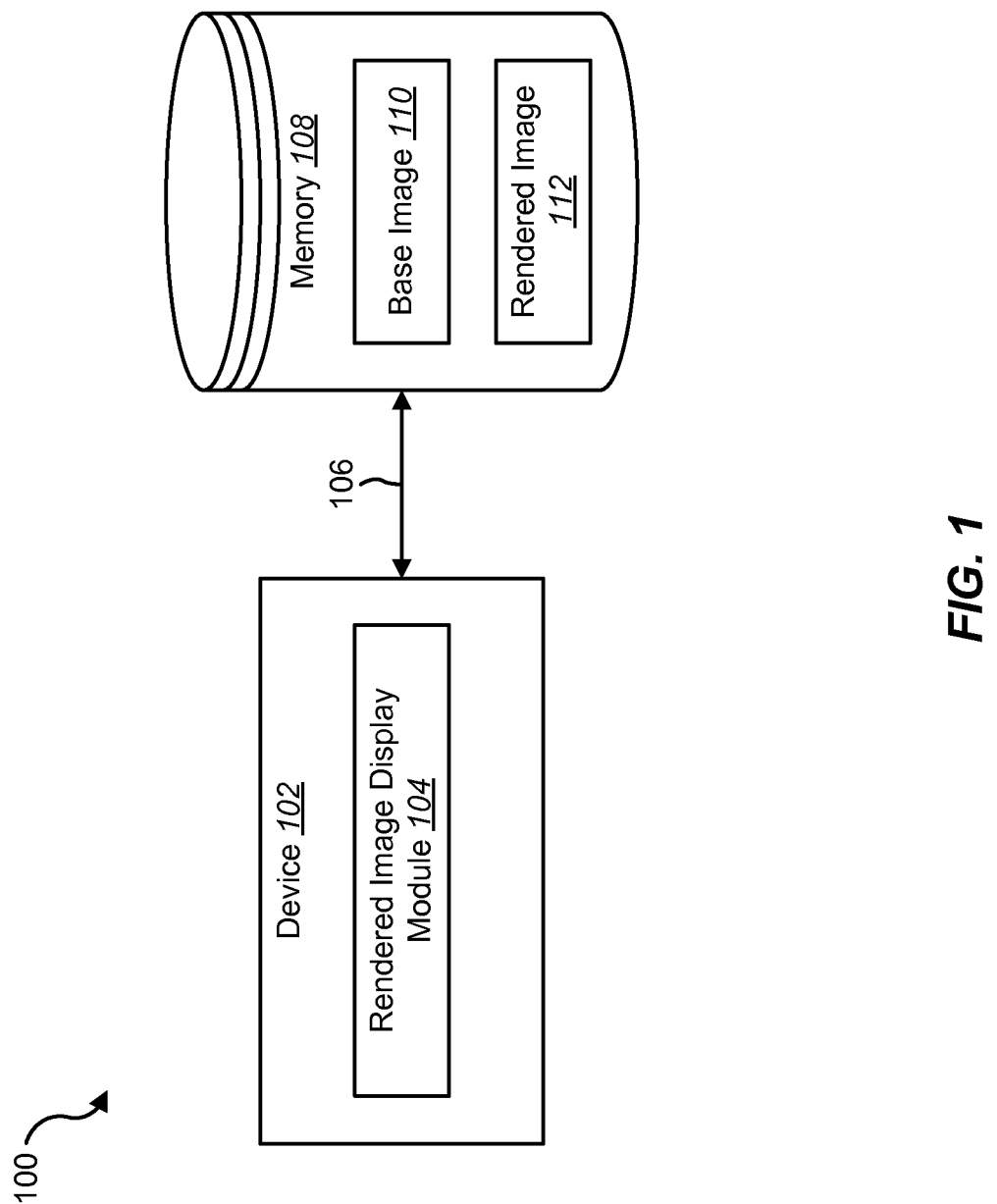
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

SUMMARY

A computer-implemented method to display a rendered image is described. A base image is obtained. A rendered image is obtained. The rendered image is matched to a location on the base image. The rendered image is overlaid onto the base image at the location to generate a set of layered images. The set of layered images is displayed.

The rendered image may include a rendered version of at least a portion of the base image. The location on the base image may correspond to the at least a portion of the base image.

The set of layered images may include the base image and the rendered image. In some cases, the rendered image may cover the at least a portion of the base image.

In some configurations, an image file having a plurality of rendered images may be obtained. In one example, obtaining a rendered image may include determining a rendered image from the plurality of rendered images based on the base image. In another example, obtaining a rendered image may include selecting a pixel area of the image file that corresponds to the determined rendered image. In some cases, each of the plurality of rendered images may correspond to the same rendering scheme.

A computing device configured to display a rendered image is also described. The computing device includes instructions stored in memory that in is in electronic communication with a processor. The instructions being executable by the processor to obtain a base image. The instructions also being executable by the processor to obtain a rendered image. The instructions additionally being executable by the processor to match the rendered image to a location on the base image. The instructions also being executable by the processor to overlay the rendered image onto the base image at the location to generate a set of layered images. The instructions further being executable by the processor to display the set of layered images.

A computer-program product to display a rendered image is additionally described. The computer-program product includes a non-transitory computer-readable storage medium that stores computer executable instructions. The instructions being executable by the processor to obtain a base image. The instructions also being executable by the processor to obtain a rendered image. The instructions additionally being executable by the processor to match the rendered image to a location on the base image. The instructions also being executable by the processor to overlay the rendered image onto the base image at the location to generate a set of layered images. The instructions further being executable by the processor to display the set of layered images.

DETAILED DESCRIPTION OF EXEMPLARY EMBODIMENTS

In various situations, it may be desirable to render an image. For example, it may be desirable for a user to virtually try-on a product so that the user may see what they would look like in and/or with the product. In this example, a base image of the user may be rendered to include the product. Typically, only a portion of the base image may be rendered. Therefore, a portion of the image may not be rendered. In these situations, it may be desirable to store only the rendered portion of the image as a rendered image. Alternatively, it may be desirable to store the region that includes the rendered portion of the image as the rendered image. This may allow the full rendered image to be created by overlaying the rendered image onto the base image at the location where the rendered image was rendered from.

In some configurations, this may allow for efficient storing, transferring, and/or processing of rendered images. This may be particularly beneficial when the same base image is used for displaying multiple renderings (as in the case of virtually trying-on products, for example). For instance, the same base image may be quickly modified to show different renderings by overlaying the appropriate rendering image. In the case that rendered images are obtained from a server, the reduced size of each rendering image and the reuse of the same base image may allow the user to virtually try-on and shop simultaneously (e.g., the products are presented to the user in the context of a rendered virtual try-on).

In one example, a user may desire to virtually try-on a pair of glasses (so that the user may see how the glasses look on their face/head, for example). The user may provide one or more images of the user's face/head (e.g., the base images). In some configurations, each base image may be rendered with a virtual pair of glasses. In one example, a region that includes the rendered pair of glasses (a strip of a user's head that includes the region around the eyes and ears of the user, for example) may be stored as the rendered image. In some configurations, multiple rendered images may be formed. For example, a rendered image may be generated for each pair of glasses. As another example, a rendered image may be generated for each position on the face that a particular pair of glasses may be positioned at. This may allow a user to change glasses and/or change the position of a pair of glasses on their face simply by overlaying the proper rendered image on the base image.

Referring now to the figures, FIG. 1 is a block diagram illustrating one embodiment of an environment 100 in which the present systems and methods may be implemented. In one embodiment, a device 102 may be coupled to a memory 108 through an interface 106. In some configurations, the device 102 may include a rendered image display module 104 that implements the systems and methods described herein.

In some configurations, the rendered image display module 104 may access data stored in the memory 108. For example, the rendered image display module 104 may obtain one or more base images 110 and one or more rendered images 112 from the memory 108. In some configurations, the rendered image display module 104 may match a rendered image 112 with a particular portion of a base image 110. In some configurations, the rendered image display module 104 may overlay the rendered image 112 onto the base image 110 to cover the particular portion of the base image 110. In some configurations, the rendered image display module 104 may display the layered images (e.g., the rendered image 112 and the base image 110). In some cases, displaying the set of layered images creates the illusion that the layered images are a single rendered image. The rendered image display module 104 is discussed in greater detail below.

In one embodiment, the memory 108 may be local to the device 102. For example, the memory 108 may be within the device 102 and/or directly attached to the device 102. In another embodiment, the memory 108 may be remote from the device 102. For example, the memory 108 may be hosted by a server. For instance, the device 102 may access the one or more base images 110 and the one or more rendered images 112 through a network (via the server, for example). In yet another embodiment, a first memory 108 may be local to the device 102 and a second memory 108 may be remote from the device 102. In this case, the rendered image display module 104 may obtain a base image 110 and/or a rendered image 112 from either memory 108. Examples of interface 106 include system buses, serial AT attachment (SATA) interfaces, universal serial bus (USB) interfaces, wired networks, wireless networks, cellular networks, satellite networks, etc. In some cases, the interface 106 may be the internet.

Figure 2:
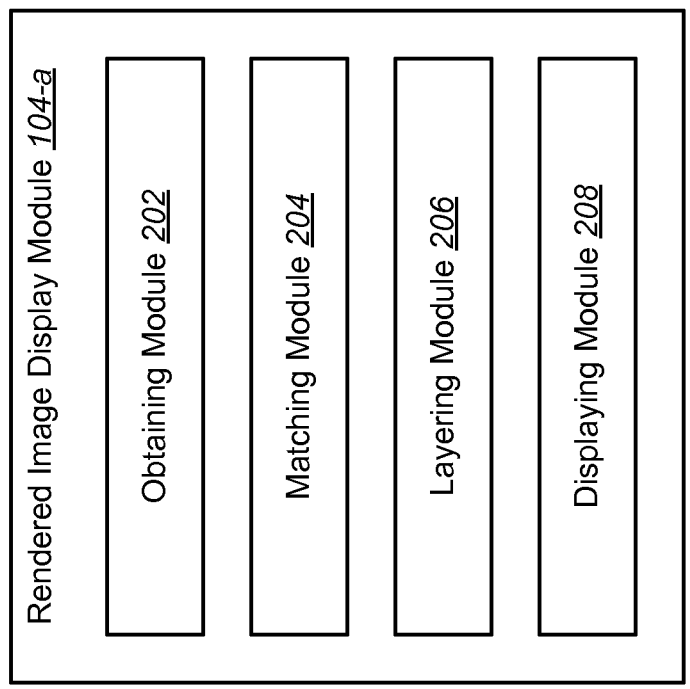
FIG. 2 is a block diagram illustrating one example of the rendered image display module.

FIG. 2 is a block diagram illustrating one example of the rendered image display module 104-*a*. The rendered image display module 104-*a* may be one example of the rendered image display module 104 illustrated in FIG. 1. In some configurations, the rendered image display module 104-*a* may include an obtaining module 202, a matching module 204, a layering module 206, and a displaying module 208.

In one embodiment, the obtaining module 202 may obtain one or more base images 110 and one or more rendered images 112. In one example, the obtaining module 202 may obtain a base image 110. In some cases, a base image 110 may be associated with a perspective (e.g., an x, y, z, orientation, for example). In one example, the obtaining module 202 may obtain a rendered image 112 based on the perspective of the base image 110. For example, the obtaining module 202 may obtain a rendered image 112 that corresponds (has the same perspective, for example) to a base image 110.

In one example, the obtaining module 202 may obtain a base image 110 and/or a rendered image 112 by initiating a read access to the memory 108. In another example, the obtaining module 202 may obtain a base image 110 and/or a rendered image 112 by receiving the base image 110 and/or the rendered image 112 from a server. In some cases, the obtaining module 202 may request the base image 110 and/or the rendered image 112 from the server and may receive the base image 110 and/or the rendered image 112 from the server in response to the request.

In one embodiment, the obtaining module 202 may obtain one or more image files (image files 502 as illustrated in FIG. 5, 6, 7, 8, or 9, for example). For example, the obtaining module 202 may obtain the one or more image files from a server as described previously. In some cases, an image file may include multiple rendered images 112. In these cases, the obtaining module 202 may determine one or more rendered image 112 from the multiple rendered images 112. For example, the obtaining module 202 may determine a rendered image 112 that corresponds to a base image 110, that corresponds to a particular rendering scheme (associated with a particular set of rendered images, for example), and/or that meets a predetermined criteria. In some cases, the obtaining module 202 may obtain a rendered image 112 by selecting the determined rendered image 112 from the image file 502. In one example, the obtaining module 202 may extract a pixel area from the image file 502 to obtain the rendered image 112.

In one embodiment, the matching module 204, may match a rendered image 112 to a location in its corresponding base image 110. For example, the matching module 204 may match the determined rendered image 112 to the location in the base image 110 that the rendered image 112 was rendered from. In some cases, the rendered image 112 may be a rendered version of a portion of the base image. In these cases, the rendered image 112 may be matched with a corresponding un-rendered version portion of the base image 110. In some cases, the matching module 204 may match the rendered image 112 with the base image 110 so that a layering of the images may create the illusion of a single rendered image.

In one embodiment, the layering module 206 may overlay a rendered image 112 onto a base image 110. In some configurations, the rendered image 112 may cover a portion of the base image 110. In one example, the rendered image 112 may be a rendered version of the portion of the base image 110 that it is covering. For instance, the layering module 206 may overlay the rendered image 112 onto the base image 110 based on the determined matching from the matching module 204. In some cases, the layering module 206 may overlay multiple rendering images 112 onto a single base image 110.

In one embodiment, the displaying module 208 may display the overlaying rendered image 112 and the underlying base image 110. In some cases, the layered images create the illusion that the base image 110 has been rendered.

Figure 3:
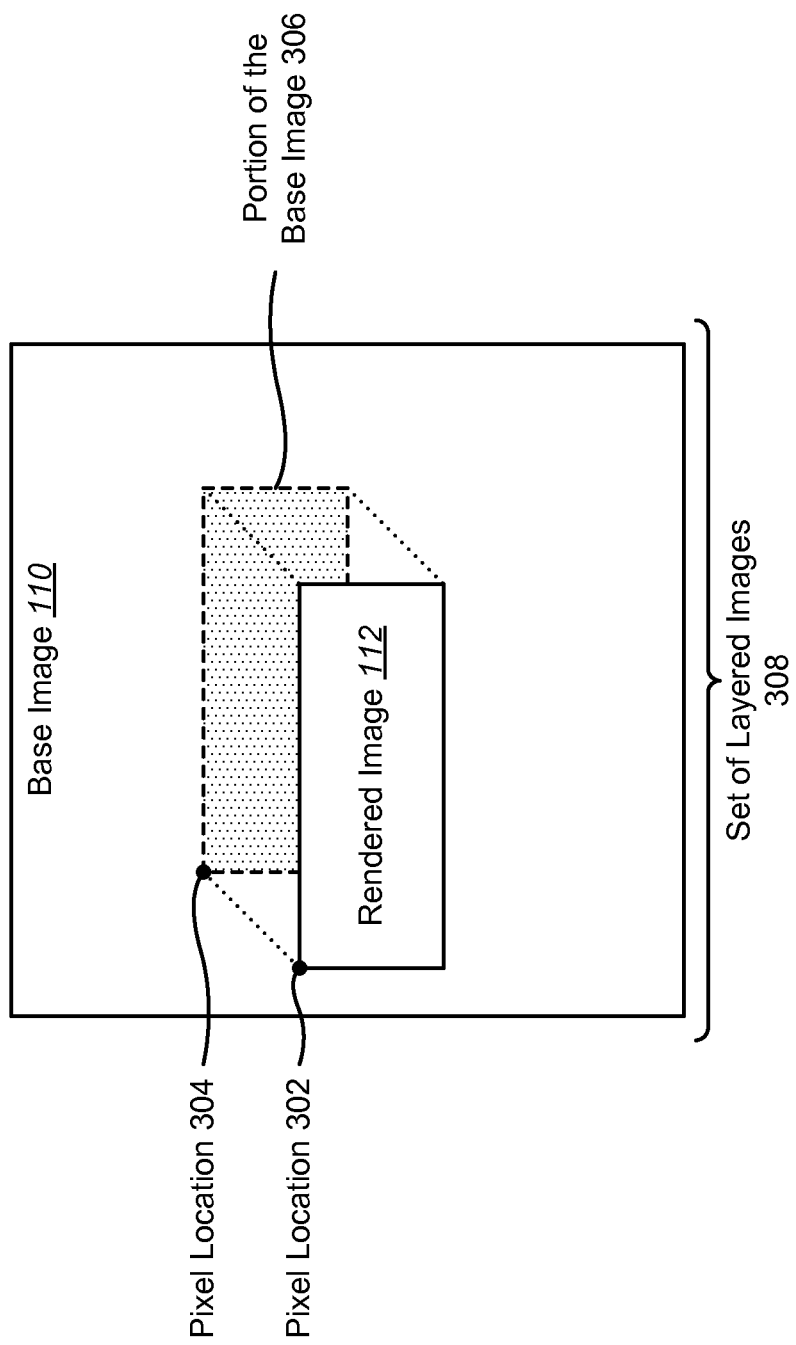
FIG. 3 is a block diagram illustrating one example of how a rendered image and a base image may be layered.

FIG. 3 is a block diagram illustrating one example of how a rendered image 112 and a base image 110 may be layered. In some configurations, the rendered image 112 may cover a portion of the base image 306. In some cases, the rendered image 112 may be a rendered version of a portion of the base image 306. In some configurations, the rendered image 112 may match the rendered image 112 with the base image 110 so that that the rendered image 112 may cover the portion of the base image 306 that it was rendered from. In one example, the pixel location 302 of the rendered image 112 may correspond to a rendered version of the pixel location 304 of the base image 110. In this example, the rendered image 112 may be matched so that the rendered image 112 may cover the portion of the base image 306. For example, pixel location 302 may be matched to pixel location 304 so that the rendered image 112 may cover the portion of the base image 306.

In some configurations, the rendered image 112 may be layered over the base image 110 based on the determined matching. For example, the rendered image 112 may be overlaid onto the base image 110 so that the rendered image 112 covers the portion of the base image 306 that the rendered image 212 was rendered from. Although FIG. 3 illustrates the case of layering one rendered image 112 onto a base image 110, it is noted that more than one rendered images 112 may be layered onto a single base image 110. In some configurations, one or more rendered images 112 that are layered with a base image 110 may be referred to as a set of layered images 308. In some cases, the set of layered images 308 may create the illusion of a single rendered image. For example, the set of layered images 308 may provide the same effect as if the entire base image 110 were rendered as a single image.

Figure 4:
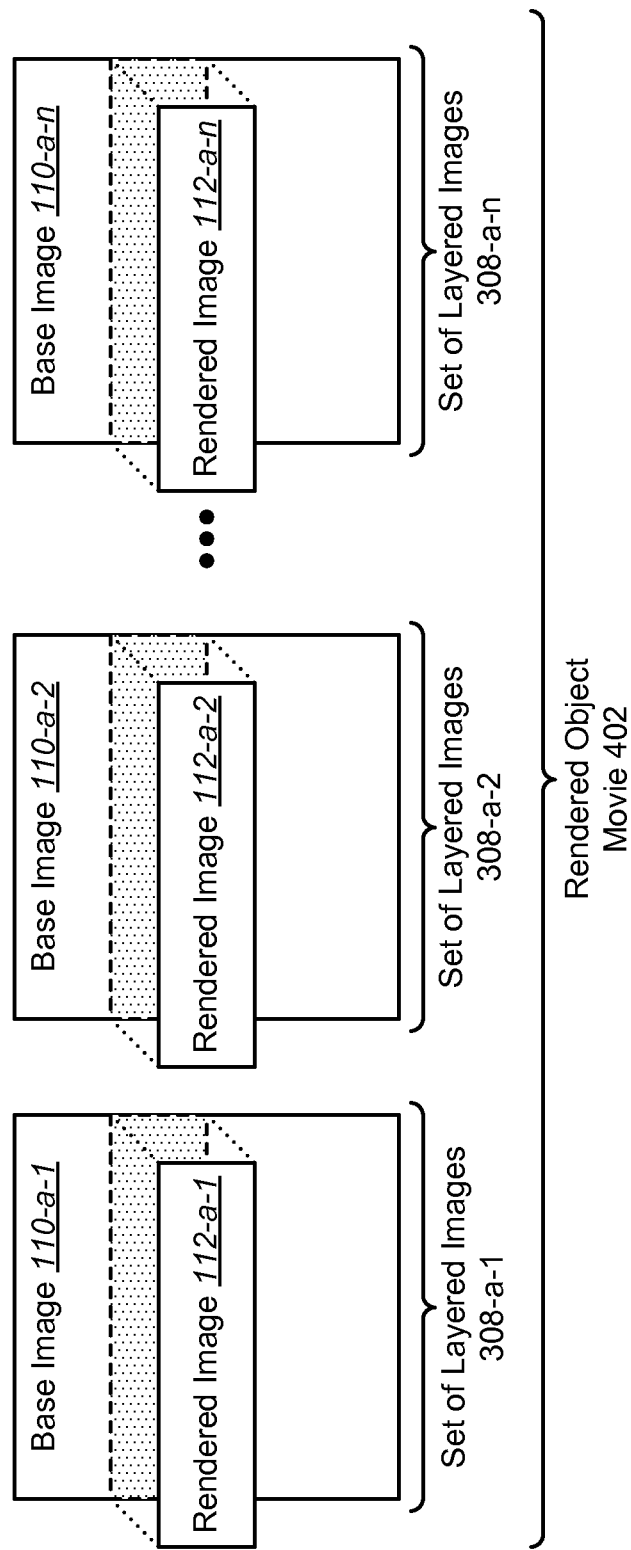
FIG. 4 is a block diagram illustrating one example of a rendered object movie based on multiple sets of layered images.

FIG. 4 is a block diagram illustrating one example of a rendered object movie 402 based on multiple sets of layered images 308. In some configurations, each set of layered images 308 may be an example of the set of layered images 308 illustrated in FIG. 3.

In some configurations, different base images 110 may depict an object in different orientations. For example, a first base image 110-*a*-1 may depict the object in a first orientation, the second base image 110-*a*-2 may depict the object in a second orientation, and the nth base image 110-*a*-*n* may depict the object in an nth orientation. In one example, these base images 110*a*-*n* may be ordered to create an object movie of the object. For example, the base images 110*a*-*n* may be ordered to so that the orientation of the object appears to rotate as two or more consecutive base images 110 are cycled.

In some configurations, each rendered image 112 may correspond to a particular base image 110. For example, a first rendered image 112-*a*-1 may correspond to the first base image 110-*a*-1, the second rendered image 112-*a*-2 may correspond to the second base image 110-*a*-2, and the nth rendered image 112-*a*-*n* may correspond to the nth base image 110-*a*-*n*. For instance, each rendered image 112 may be a rendered version of a portion of its corresponding base image 110. In some configurations, a first set of layered images 308-*a*-1 may include the first rendered image 112-*a*-1 and the first base image 110-*a*-1, a second set of layered images 308-*a*-2 may include the second rendered image 112-*a*-2 and the second base image 110-*a*-2, and an nth set of layered images 308-*a*-*n* may include the nth rendered image 112-*a*-*n* and the nth base image 110-*a*-*n*. In some cases, the first set of layered images 308-*a*-1, the second set of layered images 308-*a*-2, and the nth set of layered images 308-*a*-*n* may be ordered to form a rendered object movie 402. In some configurations, the rendered object movie 402 may create the illusion of an object movie of rendered base images.

In one example, the systems and methods described herein may be used for virtually trying-on glasses. In this example the base images 110 may be images of a user's face/head in various orientations. For instance, a first base image 110-*a*-1 may be an image of a user's face/head in a left facing orientation, a second base image 110-*a*-2 may be an image of a user's face/head in a center facing orientation, and a third base image 110-*a*-3 may be an image of a user's face/head in a right facing orientation. In this example, each rendered images 112 may be a rendered version of a portion of a base image 110. For example, the first rendered image 112-*a*-1 may include a portion of the user's face/head with a rendered set of glasses (rendered based on the left facing orientation of the first base image 110-*a*-1, for example), the second rendered image 112-*a*-2 may include a portion of the user's face/head with the rendered set of glasses (rendered based on the center facing orientation of the second base image 110-*a*-2), and the third rendering image 112-*a*-2 may include a portion of the user's face/head with the rendered set of glasses (rendered based on the right facing orientation of the third base image 110-*a*-3). In one example, the portion of the user's face/head may be a strip that includes the eye and ear regions of the user's face/head. In some configurations, each rendered image 112 may be layered with its corresponding base image 110 to create sets of layered images 308. In one example, these sets of layered images 308 may be ordered to create a rendered object movie 402 that allows the rendered glasses to be viewed on the user's face/head from the various orientations of the underlying base images 110.

In a similar example, seventeen base images 110 may be used as the basis for a rendered object movie 402 (of a virtual try-on, for example). In one embodiment, base images 110-*a*-1 through 110-*a*-8 may be images of the user's face/head in various (e.g., decreasingly) left facing orientations, the ninth base image 110-*a*-9 may be an image of the user's face/head in a center facing orientation, and base images 110-*a*-10 through 110-*a*-17 may be images of the user's face/head in various (e.g., increasingly) right facing orientations. As described above, rendered images 112 based on these base images 110 and layered on their corresponding base images 110 may enable the efficient creation of a rendered object movie 402 (e.g., virtual try-on). In some cases, more (or less) than seventeen base images 110 may be used.

Figure 5:
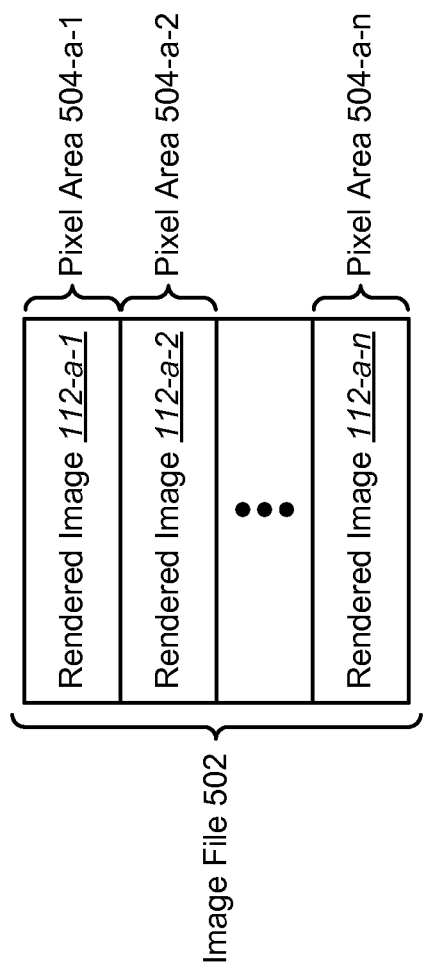
FIG. 5 is a block diagram illustrating one example of an image file that includes more than one rendered images.

FIG. 5 is a block diagram illustrating one example of an image file 502 that includes more than one rendered images 112. In some configurations, the image file 502 may include at least one rendered image 112 for each base image 110. In one example, the first rendered image 112-a-1 may be a rendered version of a portion of the first base image 110-a-1, the second rendered image 112-a-2 may be a rendered version of a portion of the second base image 110-a-2, and the nth rendered image 112-a-n may be a rendered version of a portion of the nth base image 110-a-n. In this example, the first rendered image 112-a-1 may be a rendered image 112 for the first base image 110-a-1, the second rendered image 112-a-2 may be a rendered image 112 for the second base image 110-a-2, and the nth rendered image 112-a-n may be a rendered image 112 for the nth base image 110-a-n.

In some cases, disparate pixel areas of the image file 502 may correspond to disparate rendered images 112. For example, a first pixel area 504-a-1 of the image file 502 may correspond to a first rendered image file 112-a-1, a second pixel area 504-a-2 of the image file 502 may correspond to a second rendered image file 112-a-2, and an nth pixel area 504-a-n of the image file 502 may correspond to an nth rendered image file 112-a-n.

In one example, each pixel area 504 may be a strip that is 80 pixels high and as wide as the image of the image file 502. In this example, the first rendered image 112-a-1 may be obtained by selecting pixels 0-80 from the image file 502, the second rendered image 112-a-2 may be obtained by selecting pixels 80-160 from the image file 502, and so forth. In other examples, the dimensions and/or location of a pixel area 504 in the image file 502 may differ. In some configurations, one or more configuration settings may define the dimensions and/or location of a pixel area 504 that should be selected to obtain a particular rendered image 112. In one example, the location of a particular rendered image 112 may be consistent across multiple image files 502.

In some configurations, an image file 502 may include one or more sets of rendered images. In one example, a set of rendered images may allow an entire object movie to be rendered with a particular rendering scheme (e.g., a first style of glasses in a first position, a second style of glasses in a first position, a first style of glasses in a second position, etc.). For example, each rendering image 112 in the set of rendering images may apply the particular rendering scheme to its corresponding base image 110. In some cases, a rendered object movie 402 may be rendered based on a single image file 502.

Figure 6:
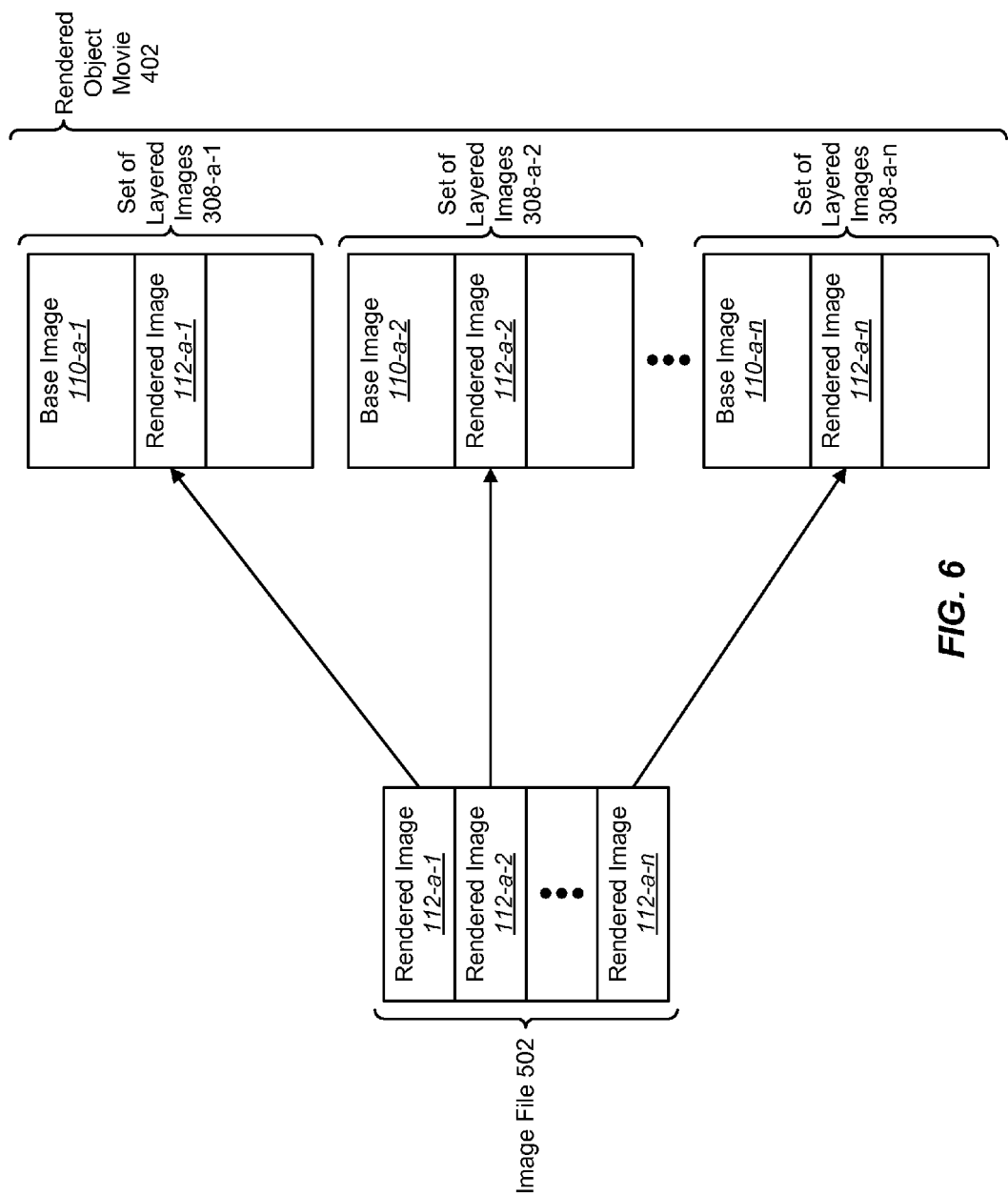
FIG. 6 is a block diagram illustrating one example of how an image file may be used to generate a rendered object movie.

FIG. 6 is a block diagram illustrating one example of how an image file 502 may be used to generate a rendered object movie 402. In one embodiment, each of the rendered images 112 in the image file 502 are part of a set rendered images 112-a.

In some cases, a set of rendered images 112-a may include a rendered image 112 for each base image 110 that applies a particular rendering scheme to each base image 110. For example, the first rendered image 112-a-1 may apply a first rendering scheme to the first base image 110-a-1, the second rendered image 112-a-2 may apply the first rendering scheme to the second base image 110-a-2, and the nth rendered image 112-a-n may apply the first rendering scheme to the nth base image 110-a-n. In one example, the first rendering scheme may be to render a particular pair of glasses in a particular position. In some cases this may allow for the creation of a rendered object movie 402 with a particular rendering scheme using a single image file 502.

In some configurations, a first set of layered images 308-a-1 may be obtained by covering a portion of the first base image 110-a-1 with the first rendered image 112-a-1, a second set of layered images 308-a-2 may be obtained by covering a portion of the second base image 110-a-2 with the second rendered image 112-a-2, and an nth set of layered image 308-a-n may be obtained by covering a portion of the nth base image 110-a-n with the nth rendered image 112-a-n. In some configurations, the sets of layered images may be ordered to create a rendered object movie 402. In the case that the rendered images 112 are from the same set of rendered images 112-a, the rendered object movie 402 may be an object movie with a single rendering scheme.

In one example, the rendered object movie 402 may be an object movie of a virtual try-on of a pair of glasses. In this scenario, the first rendered image 112-a-1 may include a particular pair of glasses rendered in a first orientation at a particular position on the user's face/head, the second rendered image 112-a-2 may include the particular pair of glasses rendered in a second orientation at the particular position on the user's face/head, and the nth rendered image 112-a-n may include the particular pair of glasses rendered in an nth orientation at the particular position on the user's face/head. In some configurations, the rendered images 112 for a rendered object movie 402 of a particular product at a particular position may be stored in and/or extracted from a single image file 502.

Figure 7:
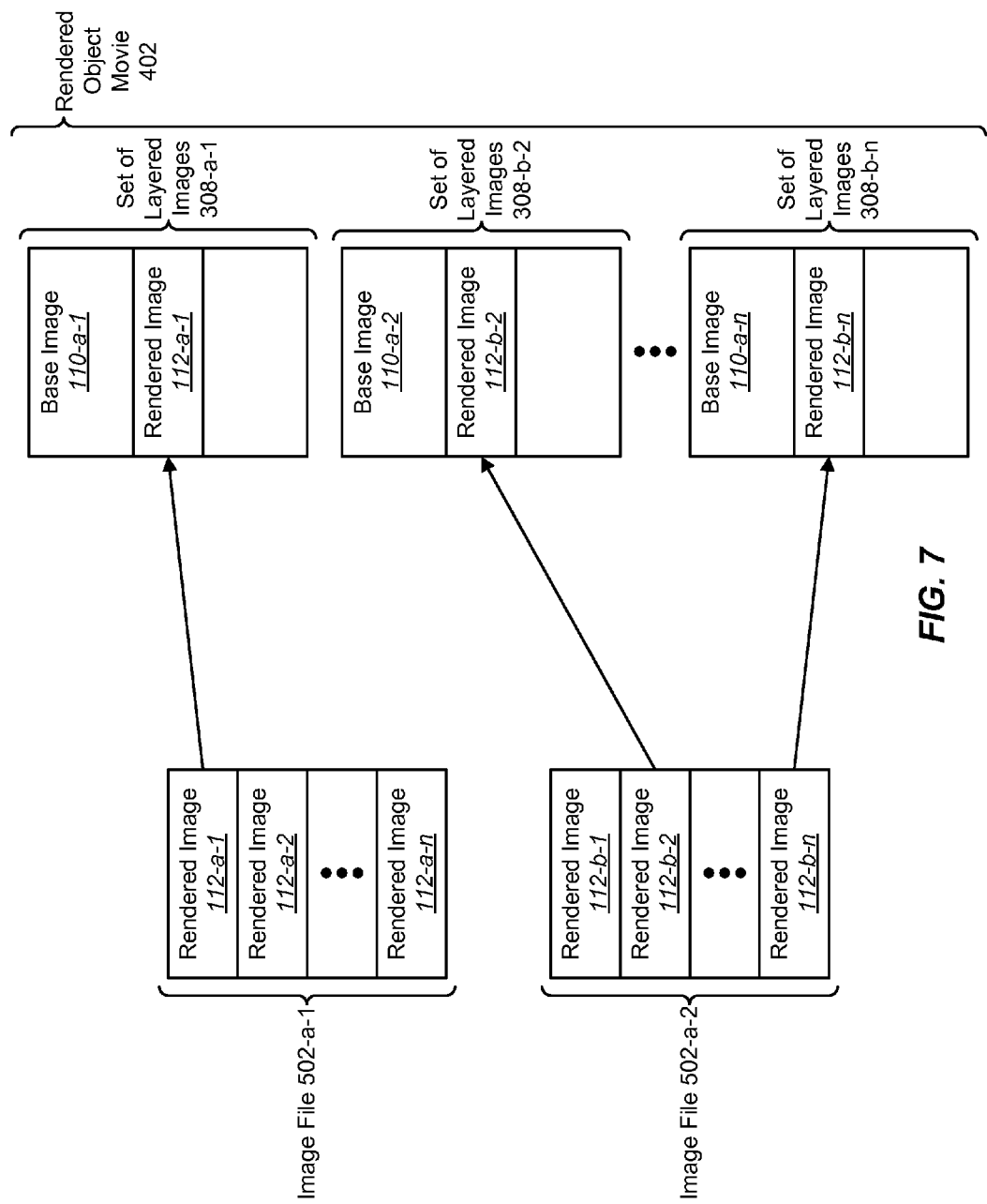
FIG. 7 is a block diagram illustrating one example of how multiple image files may be used to generate a rendered object movie.

FIG. 7 is a block diagram illustrating one example of how multiple image files 502 may be used to generate a rendered object movie 402. In some cases, a first image file 502-a-1 may include a first set of rendered images 112-a (e.g., a first pair of glasses rendered in a first position) and a second image file 502-a-2 may include a second set of rendered images 112-b (e.g., the first pair of glasses rendered in a second position, a second pair of glasses rendered in a first position, the second pair of glasses rendered in a second position, etc.).

In one example, a first rendering scheme may be selected (e.g., a first pair of glasses rendered in a first position). For example, a first set of rendered images 112-a may be used to generate each set of layered images 308. For instance, a first set of layered images 308-a-1 may be obtained by overlaying the first rendered image 112-a-1 from the first image file 502-a-1 onto the first base image 110-a-1. In some cases, the rendering scheme may be changed. For example, a second rendering scheme may subsequently be selected. For example, a second set of rendering image 112-b may be used to generate each set of layered images 308. For instance, a second set of layered images 308-b-2 may be obtained by overlaying the second rendered image 112-b-2 from the second image file 502-a-2 onto the second base image 110-a-2, and an nth set of layered images 308-b-n may be obtained by overlaying the nth rendered image from the second image file 502-a-2 onto the nth base image 110-a-n. As illustrated in FIG. 7, the first set of layered images 308-a-1 is based on the first set of rendered images 112-a and the second and nth sets of layered images 308-b-2, 308-b-n are based on the second set of rendered images 112-b. However, before the change in rendering schemes, each of sets of layered images 308 may be based on the first set of rendered images 112-a and after the change in rendering schemes, each of the sets of layered images 308 may be based on the second set of rendered images 112-b.

For example, a user a user may change glasses positions during the display of the rendered object movie 402. In this scenario, previous to the change in position, the sets of rendered images 308 may be based on the first glasses position and after the change in position, the sets of rendered images 308 may be based on the second glasses position.

Figure 8:
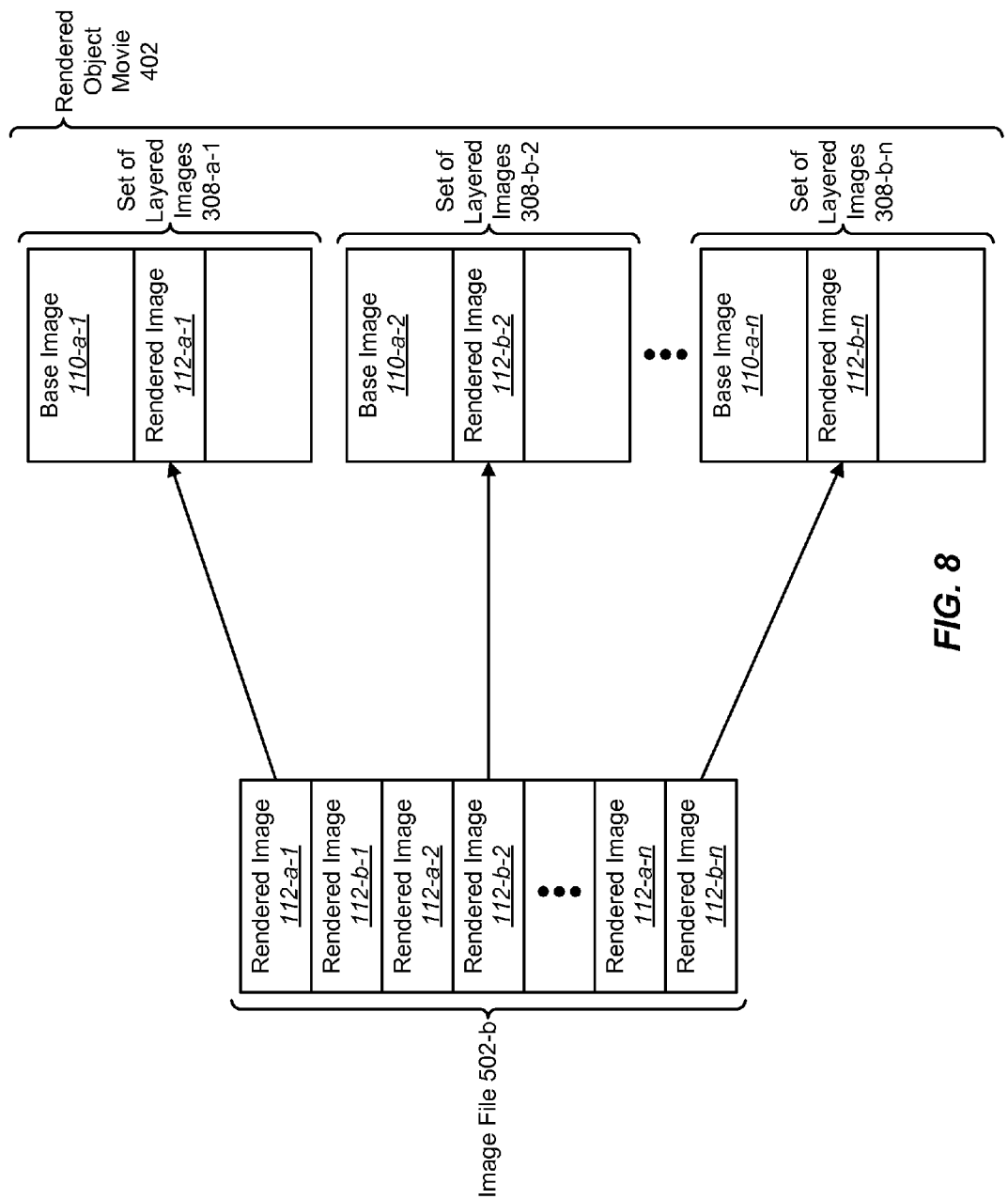
FIG. 8 is a block diagram illustrating one example of how a single image file with multiple sets of rendered images may be used to generate a rendered object movie.

FIG. 8 is a block diagram illustrating one example of how a single image file 502-*b* with multiple sets of rendered images may be used to generate a rendered object movie 402. In some configurations, an image file 502-*b* may include a first set of rendered images 112-*a* (e.g., a first pair of glasses rendered in a first position) and a second set of rendered images 112-*b* (e.g., the first pair of glasses rendered in a second position, a second pair of glasses rendered in a first position, the second pair of glasses rendered in a second position, etc.).

In one example, a first rendering scheme may be selected (e.g., a first pair of glasses rendered in a first position). For example, a first set of rendered images 112-*a* may be used to generate each set of layered images 308. For instance, a first set of layered images 308-*a*-1 may be obtained by overlaying the first rendered image 112-*a*-1 onto the first base image 110-*a*-1. In some cases, the rendering scheme may be changed. For example, a second rendering scheme may subsequently be selected. For example, a second set of rendering image 112-*b* may be used to generate each set of layered images 308. For instance, a second set of layered images 308-*b*-2 may be obtained by overlaying the second rendered image 112-*b*-2 onto the second base image 110-*a*-2, and an nth set of layered images 308-*b*-*n* may be obtained by overlaying the nth rendered image onto the nth base image 110-*a*-*n*. As illustrated in FIG. 8, the first set of layered images 308-*a*-1 is based on the first set of rendered images 112-*a* and the second and nth sets of layered images 308-*b*-2, 308-*b*-*n* are based on the second set of rendered images 112-*b*. However, before the change in rendering schemes, each of sets of layered images 308 may be based on the first set of rendered images 112-*a* and after the change in rendering schemes, each of the sets of layered images 308 may be based on the second set of rendered images 112-*b*. In this example, multiple sets of rendered images may be included in the same image file 502-*b*.

Figure 9:
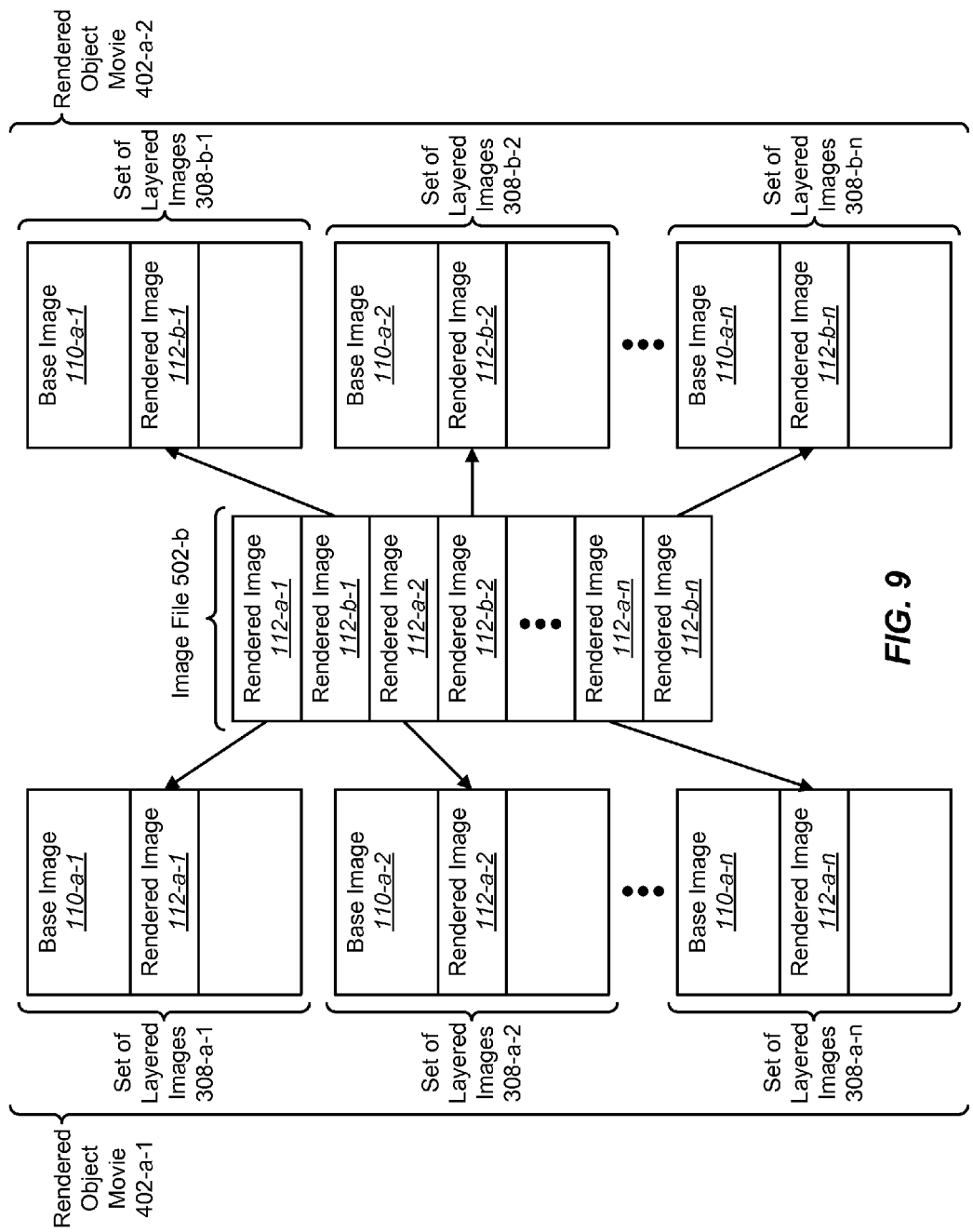
FIG. 9 is a block diagram illustrating one example of how a single image file with multiple sets of rendered images may be used to generate disparate rendered object movies.

FIG. 9 is a block diagram illustrating one example of how a single image file 502 with multiple sets of rendered images may be used to generate disparate rendered object movies 402. In some configurations, the image file 502-*b* may include a first set of rendered images 112-*a* (e.g., a first pair of glasses rendered in a first position) and a second set of rendered images 112-*b* (e.g., the first pair of glasses rendered in a second position, a second pair of glasses rendered in a first position, the second pair of glasses rendered in a second position, etc.).

In some configurations, a first set of layered images 308-*a*-1 may be obtained by overlaying the first rendered image 112-*a*-1 from the first set of rendered images 112-*a* onto the first base image 110-*a*-1, a second set of layered images 308-*a*-2 may be obtained by overlaying the second rendered image 112-*a*-2 from the first set of rendered images 112-*a* onto the second base image 110-*a*-2, and an nth set of layered images 308-*a*-*n* may be obtained by overlaying the nth rendered image from the first set of rendered images 112-*a* onto the nth base image 110-*a*-*n*. Similarly, a first set of layered images 308-*b*-1 may be obtained by overlaying the first rendered image 112-*b*-1 from the second set of rendered images 112-*b* onto the first base image 110-*a*-1, a second set of layered images 308-*b*-2 may be obtained by overlaying the second rendered image 112-*b*-2 from the second set of rendered images 112-*b* onto the second base image 110-*a*-2, and an nth set of layered images 308-*b*-*n* may be obtained by overlaying the nth rendered image from the second set of rendered images 112-*b* onto the nth base image 110-*a*-*n*. As illustrated in FIG. 9, the same base images 110 may be used for disparate rendered object movies 402 because the particular rendered images 112 are overlaid onto the base images 110.

In one example, the first set of rendered images 112-*a* may have a first rendering scheme (e.g., a first pair of glasses in a first position) and the second set of rendered images 112-*b* may have a second rendering scheme (e.g., a first pair of glasses in a second position). In this example, the first rendered object movie 402-*a*-1 may be a virtual-try on for the first pair of glasses in the first position and the second rendered object movie 402-*a*-2 may be a virtual try-on for the first pair of glasses in the second position.

Figure 10:
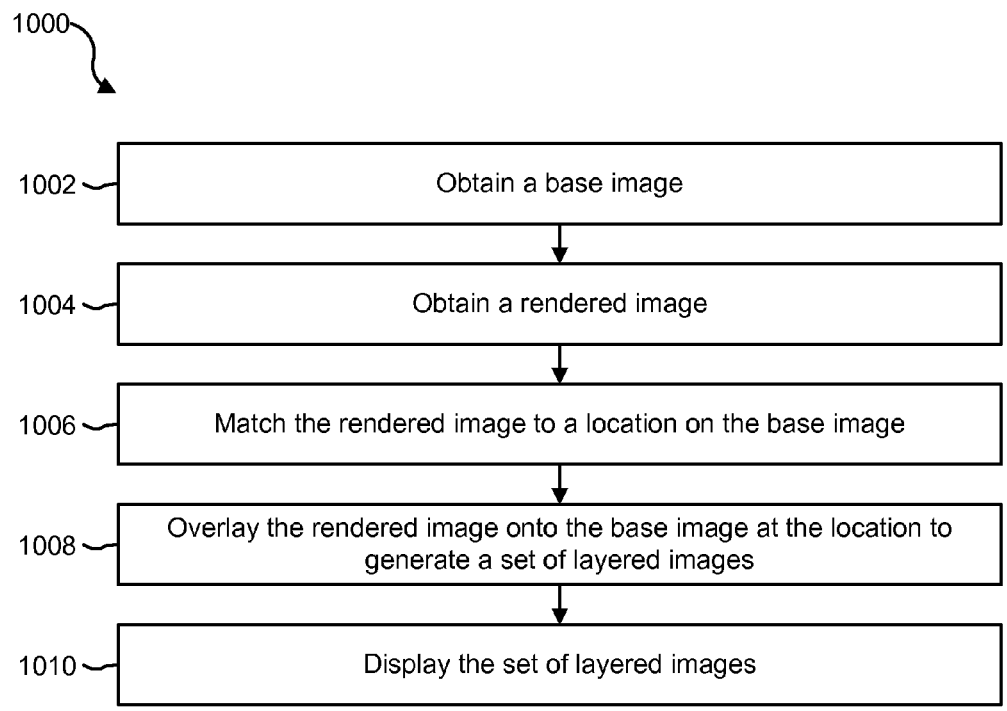
FIG. 10 is a flow diagram illustrating one embodiment of a method to display rendered images.

FIG. 10 is a flow diagram illustrating one embodiment of a method 1000 to display rendered images. In some configurations, the method 1000 may be implemented by the rendered image display module 104 illustrated in FIG. 1 or 2.

At step 1002, a base image may be obtained. At step 1004, a rendered image may be obtained. At step 1006, the rendered image may be matched to a location on the base image. For example, the rendered image may be matched to a pixel location on the base image so that the rendered image covers the portion of the base image that the rendered image was rendered from. At step 1008, the rendered image may be overlaid onto the base image at the location to generate a set of layered images. At step 1010, the set of layered images may be displayed.

Figure 11:
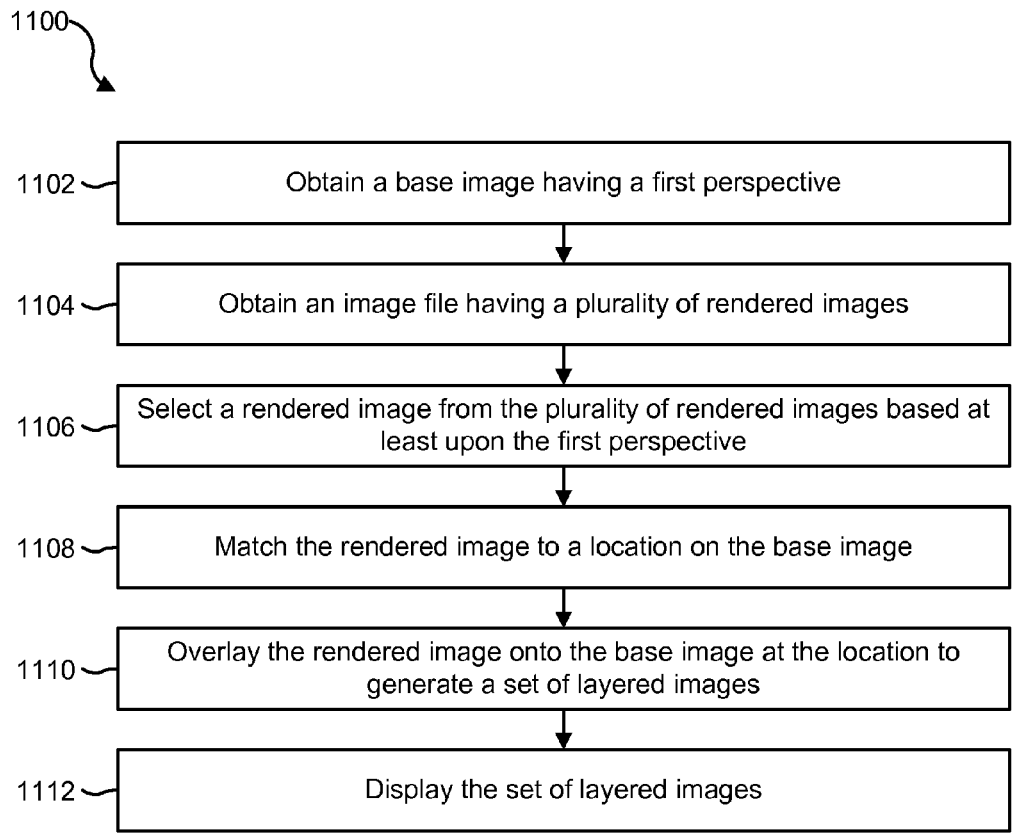
FIG. 11 is a flow diagram illustrating another embodiment of a method to display rendered images.

FIG. 11 is a flow diagram illustrating another embodiment of a method 1000 to display rendered images. In some configurations, the method 1100 may be implemented by the rendered image display module 104 illustrated in FIG. 1 or 2.

At step 1102, a base image having a first perspective may be obtained. At step 1104, an image file having a plurality of rendered images may be obtained. At step 1106, a rendered image may be selected from the plurality of rendered images based at least upon the first perspective. For example, the rendered image may be rendered based on the first perspective. At step 1108, the rendered image may be matched to a location on the base image. At step 1110, the rendered image may be overlaid onto the base image at the location to generate a set of layered images. At step 1112, the set of layered images may be displayed.

Figure 12:
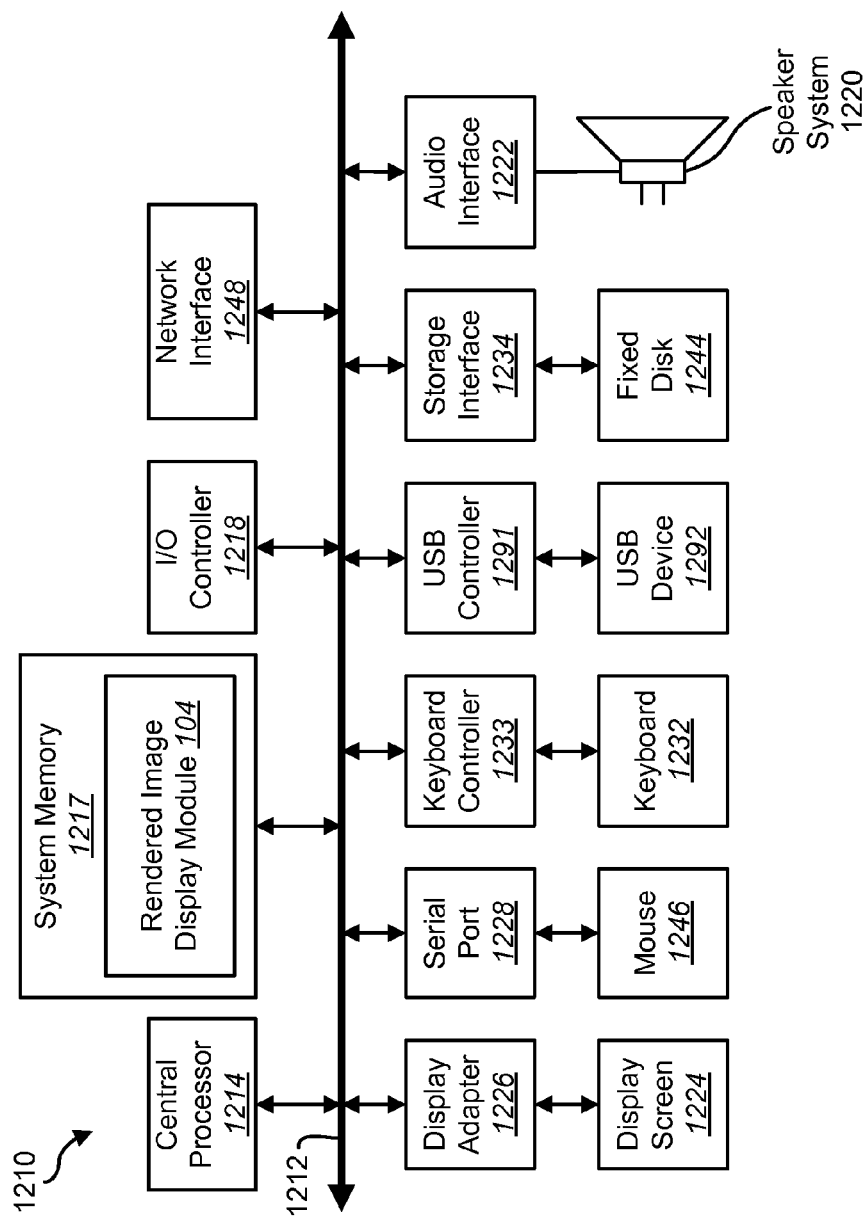
FIG. 12 depicts a block diagram of a computer system suitable for implementing the present systems and methods.

FIG. 12 depicts a block diagram of a computer system 1210 suitable for implementing the present systems and methods. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, an keyboard 1232 (interfaced with a keyboard controller 1233) (or other input device), multiple USB devices 1292 (interfaced with a USB controller 1291), and a storage interface 1234. Also included are a mouse 1246 (or other point-and-click device) and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the rendered image display module 104 to implement the present systems and methods may be stored within the system memory 1217. Applications resident with computer system 1210 are generally stored on and accessed via a non-transitory computer readable medium, such as a hard disk drive (e.g., fixed disk 1244) or other storage medium. Additionally, applications can be in the form of electronic signals modulated in accordance with the application and data communication technology when accessed via interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 12 need not be present to practice the present systems and methods. The devices and subsystems can be interconnected in different ways from that shown in FIG. 12. The operation of a computer system such as that shown in FIG. 12 is readily known in the art and is not discussed in detail in this application. Code to implement the present disclosure can be stored in a non-transitory computer-readable medium such as one or more of system memory 1217 or fixed disk 1244. The operating system provided on computer system 1210 may be iOS®, MS-DOS®, MS-WINDOWS®, OS/2®, UNIX®, Linux®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to display a rendered image, comprising:
obtaining, via a processor, a first base image and a second base image;
obtaining, via the processor, an object image;
overlaying, via the processor, the object image over the first base image;
obtaining, via the processor, a rendered image, wherein obtaining the rendered image comprises extracting a portion of the first base image overlaid with the object image;
identifying, via the processor, a point of interest in the portion of the first base image in the rendered image;
identifying, via the processor, a matching point of interest in the second base image;
matching, via the processor, the identified point of interest in the portion of the first base image of the rendered image to the identified point of interest in the second base image;
overlaying, via the processor, the rendered image onto the second base image at the matching points of interest to generate a first set of layered images; and
displaying, via the processor, the first set of layered images.

2. The method of claim 1, wherein the first set of layered images comprises
the rendered image covering at least a portion of the second base image.

3. The method of claim 1, further comprising, obtaining an image file having a plurality of rendered images.

4. The method of claim 3, wherein obtaining a rendered image comprises:
determining a rendered image from the plurality of rendered images based on the second base image; and selecting a pixel area of the image file that corresponds to the determined rendered image.

5. The method of claim 3, wherein each of the plurality of rendered images corresponds to a rendering scheme.

6. The method of claim 1, wherein the first set of layered images creates an illusion that the overlaying rendered image and the underlying base image are a single image.

7. The method of claim 1, wherein the first set of layered images is displayed as part of an object movie.

8. The method of claim 7, further comprising:
   obtaining, via a processor, a third base image, wherein the first base image, the second base image, and the third base image are images of a user, wherein the third base image displays the user in an orientation different than an orientation of the user in the second base image;
   overlaying, via the processor, a second rendered image onto the third base image to generate a second set of layered images; and
   selectively displaying, via the processor, the first and second set of layered images to create the object movie.

9. A computing device configured to display a rendered image, comprising:
   a processor;
   memory in electronic communication with the processor;
   instructions stored in the memory, the instructions being executable by the processor to:
      obtain a first base image and a second base image;
      obtain an object image;
      overlay the object image over the first base image;
      obtain a rendered image, obtaining the rendered image comprising extracting a portion of the first base image overlaid with the object image;
      identify a point of interest in the portion of the first base image in the rendered image;
      identify a matching point of interest in the second base image;
      match the identified point of interest in the portion of the first base image of the rendered image to the identified point of interest in the second base image;
      overlay the rendered image onto the second base image at the matching points of interest to generate a first set of layered images; and
      display the first set of layered images.

10. The computing device of claim 9, wherein the first set of layered images comprises
   the rendered image covering, at least a portion of the second base image.

11. The computing device of claim 9, wherein the instructions are further executable by the processor to obtain an image file having a plurality of rendered images.

12. The computing device of claim 11, wherein the instructions executable by the processor to obtain a rendered image comprise instructions executable by the processor to:
   determine a rendered image from the plurality of rendered images based on the base image; and
   select a pixel area of the image file that corresponds to the determined rendered image.

13. The computing device of claim 11, wherein each of the plurality of rendered images corresponds to a rendering scheme.

14. The computing device of claim 9, wherein the first set of layered images creates an illusion that the overlaying rendered image and the underlying base image are a single image.

15. The computing device of claim 9, wherein the first set of layered images is displayed as part of an object movie.

16. The computing device of claim 9, wherein the instructions are further executable by the processor to:
   obtain a third base image, wherein the first base image, the second base image, and the third base image are images of a user, wherein the third base image displays the user in an orientation different than an orientation of the user in the second base image;
   overlay a second rendered image onto the third base image to generate a second set of layered images; and
   selectively display the first and second set of layered images to form an object movie.

17. A computer-program product to display a rendered image, the computer-program product comprising a non-transitory computer-readable storage medium that stores computer executable instructions, the instructions being executable by a processor to:
   obtain a first base image and a second base image;
   on of the first base image;
   obtain an object image;
   overlay the object image over the first base image;
   obtain a rendered image, obtaining the rendered image comprising extracting a portion of the first base image overlaid with the object image;
   identify a point of interest in the portion of the first base image in the rendered image;
   identify a matching point of interest in the second base image;
   match the identified point of interest in the portion of the first base image of the rendered image to the identified point of interest in the second base image;
   overlay the rendered image onto the second base image at the matching points of interest to generate a first set of layered images; and
   display the first set of layered images.

18. A computer-implemented method to display a rendered image, comprising:
   obtaining, via a processor, a first base image and a second base image;
   obtaining, via the processor, an object image;
   overlaying, via the processor, the object image over the first base image;
   obtaining, via the processor, a rendered image, wherein obtaining the rendered image comprises extracting data representing a portion of the first base image overlaid with the object image;
   matching, via the processor, an identified point of interest in the portion of the first base image of the rendered image to a corresponding identified point of interest in the second base image;
   overlaying, via the processor, the rendered image, using the extracted data, onto the second base image at the matching points of interest to generate a set of layered images; and
   displaying, via the processor, the set of layered images.

19. The computer-implemented method of claim 18, wherein the extracting data representing a portion of the first base image overlaid with the object image comprises extracting, via the processor, a portion of the rendered image of the first base image overlaid with the object image.

20. The method of claim 18, further comprising:
   obtaining, via a processor, a third base image, wherein the first base image, the second base image, and the third base image are images of a user, wherein the third base image displays the user in an orientation different than an orientation of the user in the second base image;

overlaying, via the processor, a second rendered image onto the third base image to generate a second set of layered images; and selectively displaying, via the processor, the first and second set of layered images to create the object movie.

21. A computer-implemented method to display a rendered image, comprising:

obtaining, via a processor, a first base image and a second base image;

obtaining, via the processor, an object image;

overlaying, via the processor, the object image over the first base image;

obtaining, via the processor, a rendered image, wherein obtaining the rendered image comprises extracting data representing a portion of the first base image overlaid with the object image;

overlaying, via the processor, the rendered image, onto the second base image to generate a first set of layered images;

obtaining, via a processor, a third base image, wherein the first base image, the second base image, and the third base image are images of a user, wherein the third base image displays the user in an orientation different than an orientation of the user in the second base image;

overlaying, via the processor, a second rendered image onto the third base image to generate a second set of layered images; and selectively displaying, via the processor, the first and second set of layered images to create the object movie.

\* \* \* \* \*